US012613587B1

(12) United States Patent
Hammer et al.

(10) Patent No.: US 12,613,587 B1
(45) Date of Patent: Apr. 28, 2026

(54) SYSTEM AND METHOD FOR DYNAMIC CHORD-BASED INPUT PROCESSING

(71) Applicant: Web42, LLC, Silverdale, WA (US)

(72) Inventors: Joe Hammer, Silverdale, WA (US); Heather Kendall, Silverdale, WA (US)

(73) Assignee: Web42, LLC, Silverdale, WA (US)

( * ) Notice: Subject to any disclaimer, the term of this patent is extended or adjusted under 35 U.S.C. 154(b) by 0 days.

(21) Appl. No.: 19/060,588

(22) Filed: Feb. 21, 2025

(51) Int. Cl.
*G06F 3/023* (2006.01)
*G06F 18/2413* (2023.01)

(52) U.S. Cl.
CPC ........ *G06F 3/0235* (2013.01); *G06F 18/2413* (2023.01)

(58) Field of Classification Search
CPC ........................... G06F 3/0235; G06F 18/2413
See application file for complete search history.

(56) References Cited

U.S. PATENT DOCUMENTS

| | | | | |
|---|---|---|---|---|
| 6,552,717 | B2 * | 4/2003 | Mailman | G06F 3/018 |
| | | | | 345/902 |
| 7,196,691 | B1 * | 3/2007 | Zweig | G06F 3/0233 |
| | | | | 345/169 |
| 7,961,903 | B2 * | 6/2011 | Lim | G06F 3/0489 |
| | | | | 455/418 |
| 8,941,594 | B2 * | 1/2015 | Rehbock | A63F 13/24 |
| | | | | 345/169 |
| 8,958,631 | B2 * | 2/2015 | Kutliroff | G06F 18/2413 |
| | | | | 382/159 |
| 9,804,701 | B2 * | 10/2017 | Westerman | G06V 30/19173 |
| 10,067,574 | B2 * | 9/2018 | Molla | G06F 3/0235 |
| 10,127,370 | B2 * | 11/2018 | Zafiris | G06F 1/1694 |
| 11,594,077 | B2 * | 2/2023 | Bui | G06N 3/08 |
| 12,164,703 | B2 * | 12/2024 | Khalife | G06F 3/0235 |
| 2014/0078063 | A1 * | 3/2014 | Bathiche | G06F 3/04886 |
| | | | | 345/168 |
| 2015/0012871 | A1 | 1/2015 | Laubach | |

(Continued)

OTHER PUBLICATIONS

International Search Report and Written Opinion for International Application No. PCT/US2025/016919, dated May 27, 2025, 10 pages.

*Primary Examiner* — Vinh T Lam
(74) *Attorney, Agent, or Firm* — Buchalter; Jason W. Croft

(57) ABSTRACT

A system and methods for processing chord-based input sequences and managing context-aware command execution. A server receives and processes input from at least one client device. An input capture module receives keypress events from a human input device and filters input signals. A chord recognition module analyzes whether a keypress sequence constitutes a recognized chording pattern based on predefined rules, including modifier-based chording, simultaneous non-modifier keypresses, release-based execution, and time-based chording. A sheet management module assigns a command sheet based on the active application or computing context. A sheet stack manager prioritizes command sheets, with the highest-priority sheet determining execution when multiple layers are active. A command execution module processes system or application commands based on the recognized chording pattern. A storage module maintains user-defined chording configurations, sheet mappings, and adaptive learning data to optimize future command execution.

20 Claims, 6 Drawing Sheets

(56)         References Cited

U.S. PATENT DOCUMENTS

| | | | | |
|---|---|---|---|---|
| 2015/0293607 | A1* | 10/2015 | Wu | G06F 3/04886 |
| | | | | 345/169 |
| 2020/0050314 | A1* | 2/2020 | Tsai | G06F 3/0235 |
| 2022/0300091 | A1* | 9/2022 | Keen | G06F 3/0216 |
| 2023/0400933 | A1 | 12/2023 | Khalife | |
| 2025/0053244 | A1* | 2/2025 | Khalife | G06F 3/0237 |

* cited by examiner

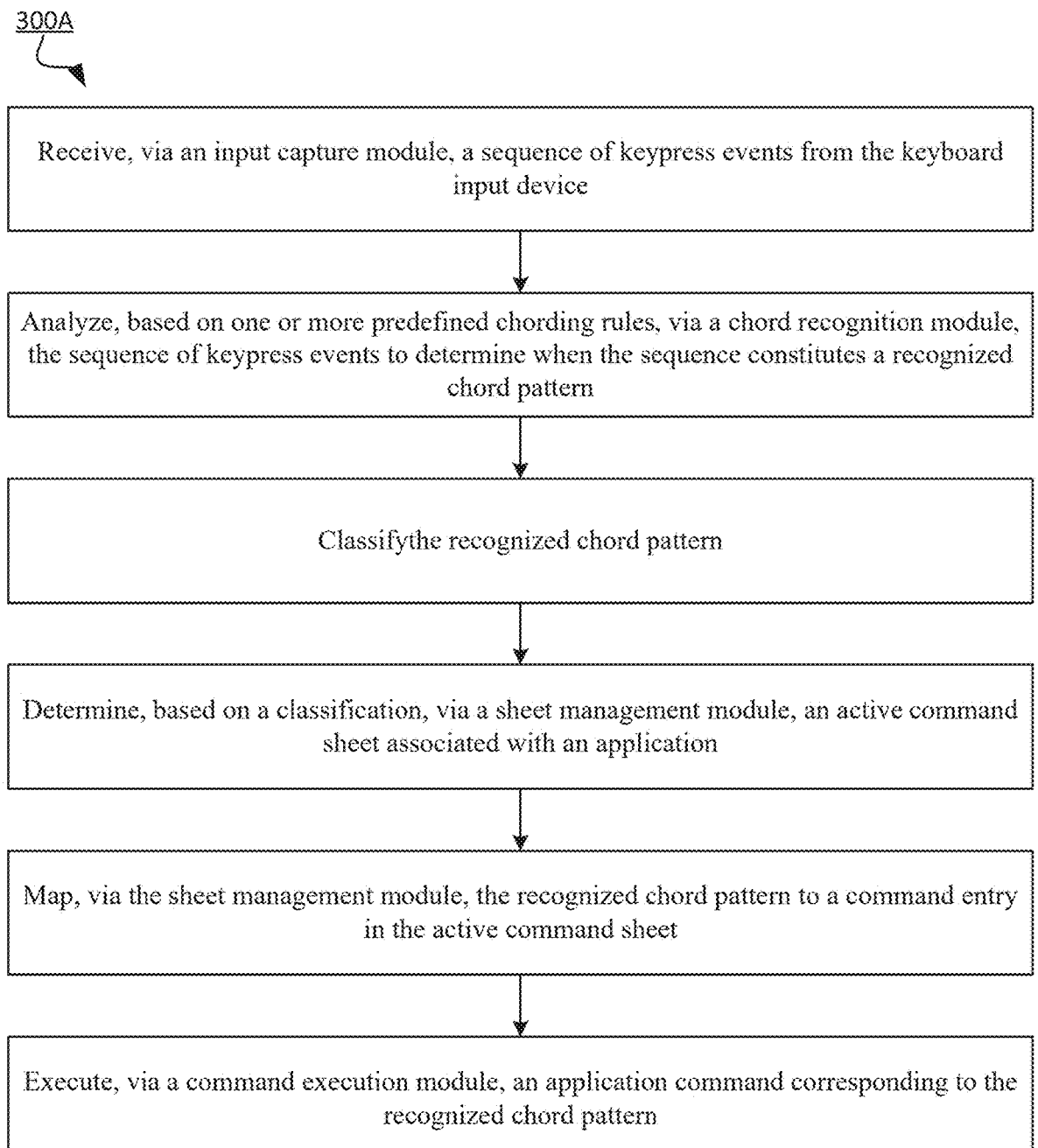

300A

Receive, via an input capture module, a sequence of keypress events from the keyboard input device Analyze, based on one or more predefined chording rules, via a chord recognition module, the sequence of keypress events to determine when the sequence constitutes a recognized chord pattern Classify the recognized chord pattern Determine, based on a classification, via a sheet management module, an active command sheet associated with an application Map, via the sheet management module, the recognized chord pattern to a command entry in the active command sheet Execute, via a command execution module, an application command corresponding to the recognized chord pattern

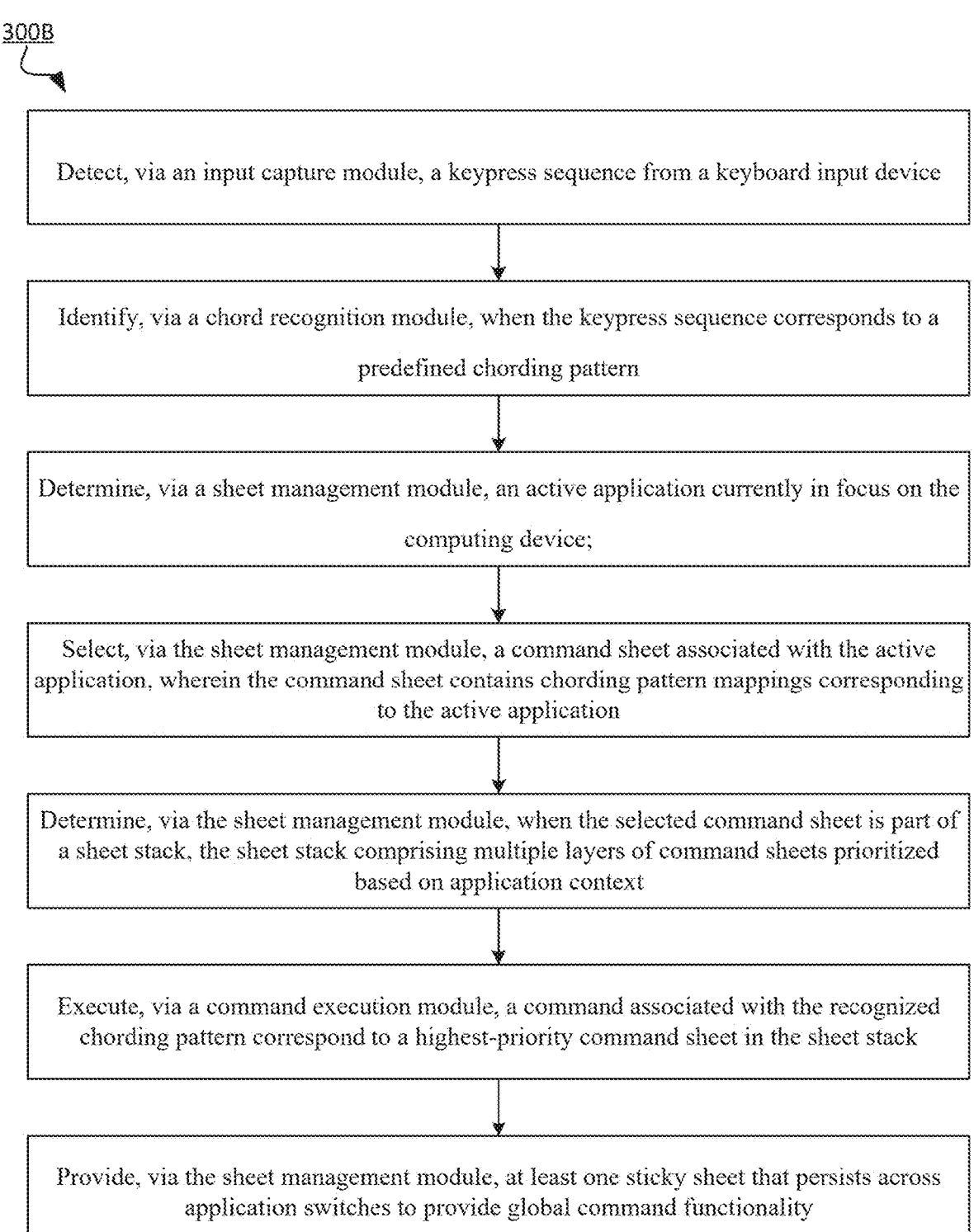

Detect, via an input capture module, a keypress sequence from a keyboard input device Identify, via a chord recognition module, when the keypress sequence corresponds to a predefined chording pattern Determine, via a sheet management module, an active application currently in focus on the computing device;

Select, via the sheet management module, a command sheet associated with the active application, wherein the command sheet contains chording pattern mappings corresponding to the active application Determine, via the sheet management module, when the selected command sheet is part of a sheet stack, the sheet stack comprising multiple layers of command sheets prioritized based on application context Execute, via a command execution module, a command associated with the recognized chording pattern correspond to a highest-priority command sheet in the sheet stack Provide, via the sheet management module, at least one sticky sheet that persists across application switches to provide global command functionality

FIG. 3B

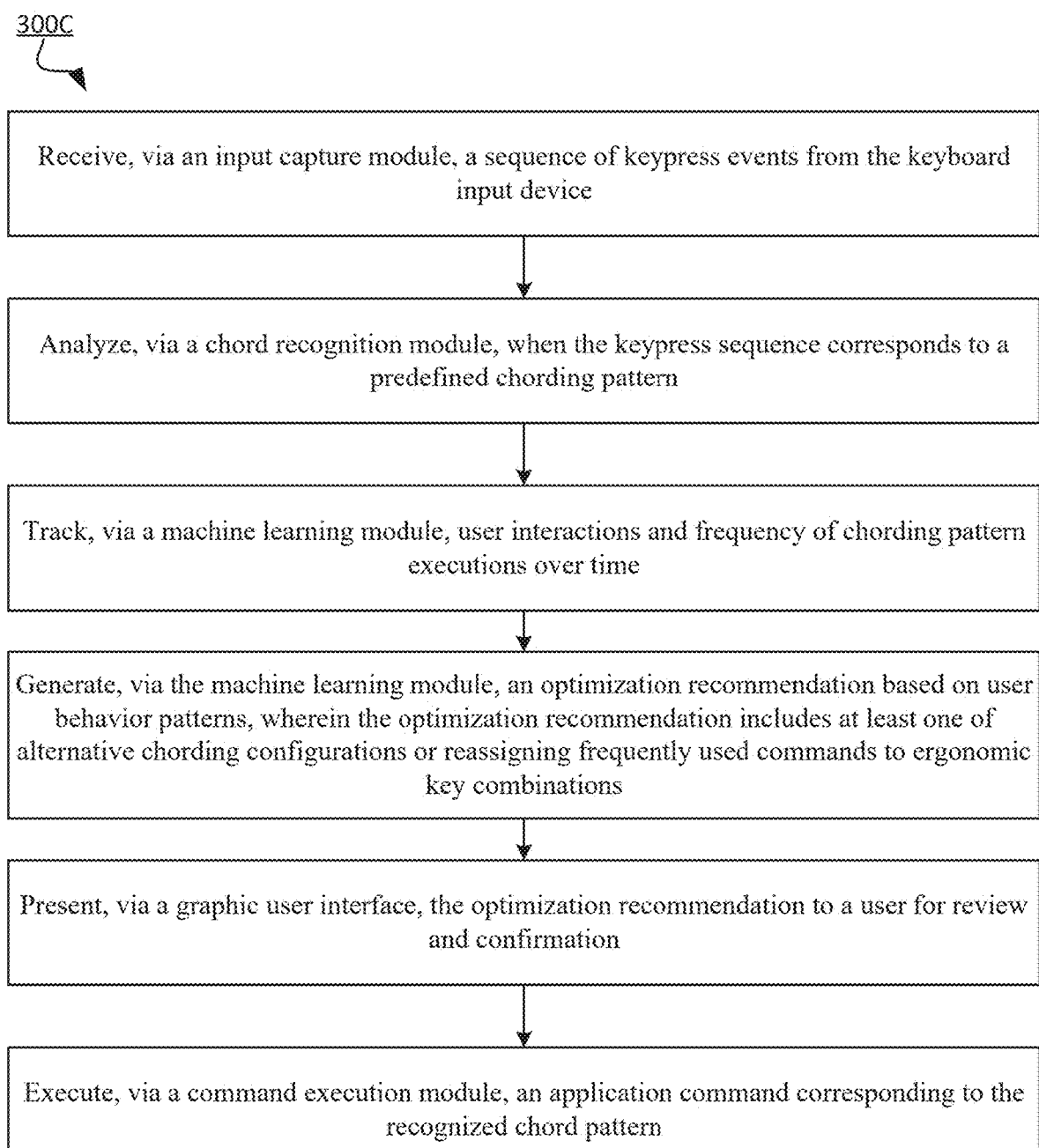

300C

Receive, via an input capture module, a sequence of keypress events from the keyboard input device Analyze, via a chord recognition module, when the keypress sequence corresponds to a predefined chording pattern Track, via a machine learning module, user interactions and frequency of chording pattern executions over time Generate, via the machine learning module, an optimization recommendation based on user behavior patterns, wherein the optimization recommendation includes at least one of alternative chording configurations or reassigning frequently used commands to ergonomic key combinations Present, via a graphic user interface, the optimization recommendation to a user for review and confirmation Execute, via a command execution module, an application command corresponding to the recognized chord pattern

FIG. 3C

SYSTEM AND METHOD FOR DYNAMIC CHORD-BASED INPUT PROCESSING

BACKGROUND

Known computing environments rely on a variety of input methods, including keyboards, touchscreens, and voice recognition, to facilitate user interaction with applications and operating systems. For example, keyboard shortcuts, often involving modifier keys such as Ctrl, Alt, and Shift, have long been used to improve efficiency by reducing reliance on manual menu navigation. However, as software applications grow increasingly complex, the number of available hotkeys has become limited, often requiring multi-key combinations that are difficult to memorize and execute efficiently. This constraint forces users to rely on inefficient workflows, leading to increased cognitive load, reduced productivity, and repetitive strain from excessive hand movement.

Additionally, shortcut inconsistencies across different applications further hinder the development of universal muscle memory, requiring users to learn distinct commands for similar functions in different software environments. Known solutions emphasize predictive text entry, speech recognition, or gesture-based inputs, rather than optimizing the efficiency and scalability of keyboard-based interactions. As the number of available shortcut keys is limited, known solutions fail to provide an ergonomic and scalable method for executing commands across different applications.

SUMMARY

A system for processing chord-based input sequences and managing context-aware command execution comprises a server configured to receive and process input from at least one client device. An input capture module executed by the server receives a sequence of keypress events from a keyboard input device and filters input signals for processing. A chord recognition module executed by the server analyzes the keypress sequence to determine whether it constitutes a recognized chording pattern based on predefined chording rules, which include traditional modifier-based chording, extended chording using simultaneous non-modifier keypresses, release-based chording wherein command execution is determined by the order of key releases, and time-based chording wherein a keypress held for a predetermined duration triggers a distinct command.

In some embodiments, a sheet management module dynamically assigns a command sheet to the recognized chording pattern based on the active application or computing context. A sheet stack manager prioritizes multiple command sheets, where the highest-priority sheet determines command execution when multiple layers of command mappings are active. A command execution module executes a system or application command corresponding to the recognized chording pattern and mapped command entry in the active command sheet. A storage module maintains user-defined chording configurations, sheet mappings, and adaptive learning data for optimizing future command execution.

Some embodiments include a method for dynamically managing chord-based command execution in a computing environment comprises detecting a keypress sequence from a keyboard input device, identifying whether the keypress sequence corresponds to a predefined chording pattern, and determining an active application currently in focus on the computing device. The method further comprises selecting a command sheet associated with the active application, wherein the command sheet contains chording pattern mappings specific to the active application, determining whether the selected command sheet is part of a sheet stack, the sheet stack comprising multiple layers of command sheets prioritized based on application context, and executing a command associated with the recognized chording pattern in accordance with the highest-priority command sheet in the sheet stack. The method also comprises maintaining at least one sticky sheet that persists across application switches to provide global command functionality.

Some embodiments include a method for adaptive learning and customization of chord-based input processing in a computing environment comprises receiving a sequence of keypress events from a keyboard input device, analyzing whether the keypress sequence corresponds to a predefined chording pattern, and tracking user interactions and frequency of chording pattern executions over time. The method further comprises generating an optimization recommendation based on user behavior patterns, wherein the optimization recommendation includes suggesting alternative chording configurations or reassigning frequently used commands to more ergonomic key combinations. The optimization recommendation is presented to a user for review and confirmation, allowing for manual customization of chord mappings to align with user workflow. The method also includes storing the customized chording configurations and dynamically updating the chording recognition model based on user preferences.

Some embodiments include a method for dynamically managing chord-based command execution in a computing environment comprises detecting a keypress sequence from a keyboard input device, identifying whether the keypress sequence corresponds to a predefined chording pattern, and determining an active application currently in focus on the computing device. The method further comprises selecting a command sheet associated with the active application, wherein the command sheet contains chording pattern mappings specific to the active application, and determining whether the selected command sheet is part of a sheet stack, the sheet stack comprising multiple layers of command sheets prioritized based on application context. The method also includes executing a command associated with the recognized chording pattern in accordance with the highest-priority command sheet in the sheet stack and maintaining at least one sticky sheet that persists across application switches to provide global command functionality.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is noted, however, that the appended drawings illustrate only some aspects of this disclosure and the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

FIGS. 2 and 3A-3C are flowcharts illustrating exemplary methods for dynamic chord based input processing, for use in the system of FIG. 1, in accordance with some embodiments.

DETAILED DESCRIPTION

Figure 1:
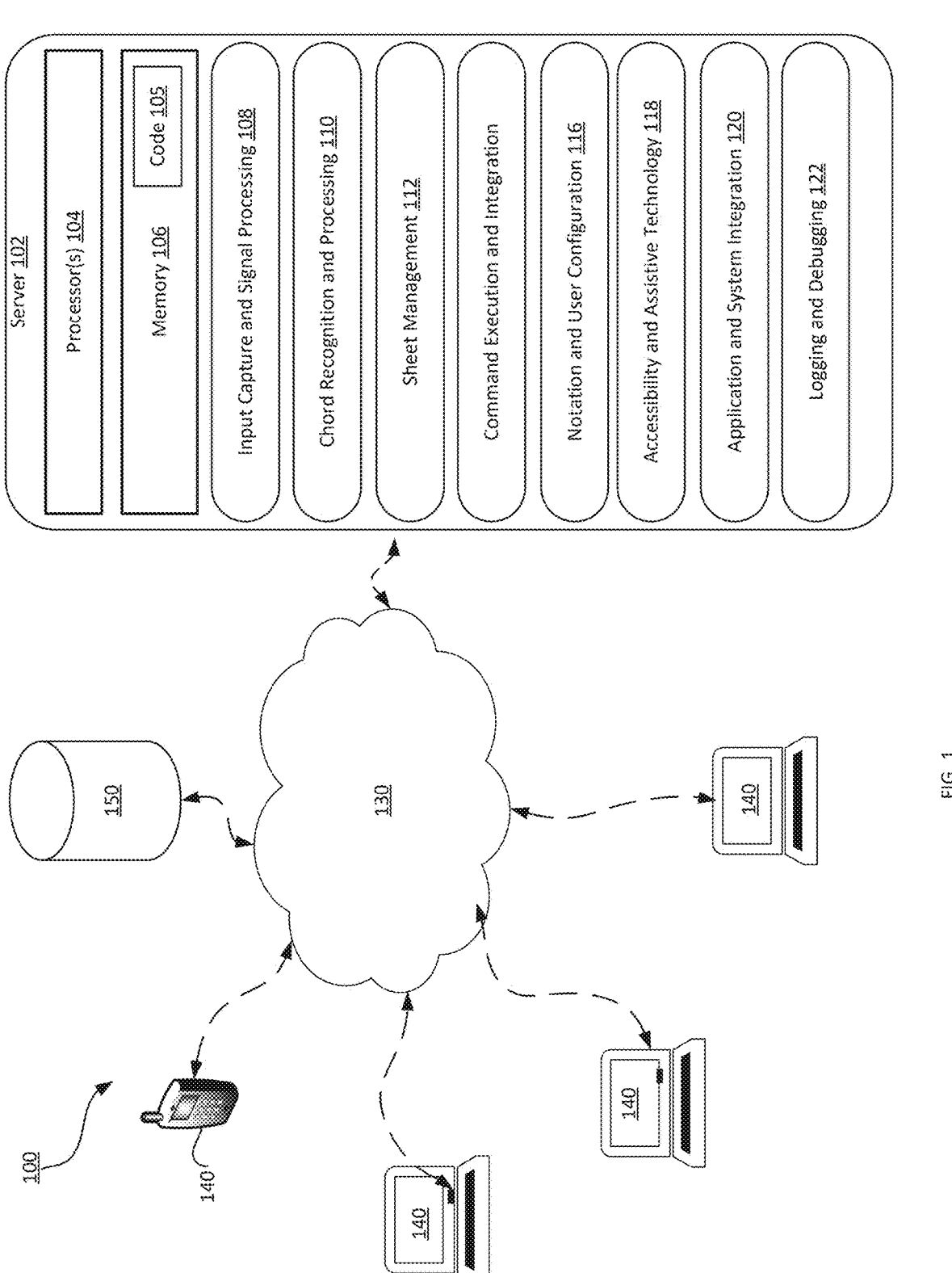
FIG. 1 illustrates an exemplary system for dynamic chord based input processing, in accordance with some embodiments.

The present disclosure will now be described in detail with reference to the drawings, which are provided as illustrative examples of the disclosure so as to enable those skilled in the art to practice the disclosure. Notably, the figures and examples below are not meant to limit the scope of the present disclosure to a single embodiment, but other embodiments are possible by way of interchange of some or all of the described or illustrated elements. Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure.

As used herein, the singular form of "a", "an", and "the" include plural references unless the context clearly dictates otherwise. As used herein, the statement that two or more parts or components are "coupled" shall mean that the parts are joined or operate together either directly or indirectly (i.e., through one or more intermediate parts or components, so long as a link occurs). As used herein, "directly coupled" means that two elements are directly in contact with each other. As used herein, "fixedly coupled" or "fixed" means that two components are coupled so as to move as one while maintaining a constant orientation relative to each other. As used herein, "operatively coupled" means that two elements are coupled in such a way that the two elements function together. It is to be understood that two elements "operatively coupled" does not require a direct connection or a permanent connection between them. As utilized herein, "substantially" means that any difference is negligible, or that such differences are within an operating tolerance that are known to persons of ordinary skill in the art and provide for the desired performance and outcomes as described in one or more embodiments herein. The term "if" is interchangeable with "when". Descriptions of numerical ranges are endpoints inclusive.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality). Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Embodiments described as being implemented in hardware should not be limited thereto, but can include embodiments implemented in software, or combinations of software and hardware, and vice-versa, as will be apparent to those skilled in the art, unless otherwise specified herein. In the exemplary embodiments described herein, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The embodiments described herein relate generally to dynamic chord-based input processing systems, components thereof, and methods of use thereof. For example, In modern computing, users are often constrained by the inefficiencies of traditional input methods. Keyboard shortcuts, while valuable, are fundamentally limited by the small number of intuitive key combinations available, forcing users to rely on awkward, hard-to-remember hotkeys like Shift+F11 or Alt+H, A, C. Additionally, these shortcuts vary drastically across different applications, requiring users to relearn commands in each software environment, disrupting workflow and increasing cognitive load. As a result, users experience reduced productivity, increased frustration, and unnecessary repetitive strain from excessive hand movement. Current solutions, such as voice commands, predictive typing, and AI-driven automation, do not fully address the core issue—the need for a fast, efficient, and scalable method of command execution that maintains the speed and familiarity of traditional keyboard interactions.

The embodiment described herein overcomes such limitations by introducing a dynamic chord-based input processing system that enables users to execute commands through intelligent chording techniques. Chording, a technique wherein multiple keys are pressed simultaneously or in sequence, is already inherent in modern keyboards and is commonly used by typists and gamers. However, traditional implementations of chording remain constrained by modifier-based shortcuts, requiring users to hold specific keys such as Ctrl, Alt, or Shift while executing commands. Accordingly, the systems and methods described herein include an enhanced chording protocol that significantly expands the number of easily accessible commands while reducing hand movement and cognitive load.

The disclosed system leverages an optimized set of frequently accessible keys, enabling chord-based command execution without relying on function keys, arrow keys, or extensive modifier-based input. By mapping commands to the 31 most ergonomically accessible keys, the system allows users to execute commands with minimal hand movement, improving efficiency and reducing repetitive strain.

For example, instead of requiring the use of Ctrl+V for pasting text, the system enables direct chording, wherein pressing C and V together, followed by releasing C (CV+ C−), executes the "Paste Text" command. By eliminating the reliance on distant or cumbersome keys, the system optimizes input efficiency, allowing users to maintain their hands in a natural resting position on the keyboard.

Unlike static hotkeys, the embodiments describe below interpret key sequences dynamically, allowing commands to be activated based on press order, timing, and simultaneity of key presses and releases. Such advantageous approach expands the number of available shortcuts while minimizing hand movement and reliance on modifier keys, making command execution more natural, ergonomic, and efficient.

The system and methods described below also enhance cross-application consistency, ensuring that common commands remain uniform across different software environments. For example, while centering text in Microsoft Word requires Ctrl+E, the equivalent command in Microsoft Excel requires a multi-step sequence (Alt+H, A, C). The embodiments described herein eliminate such inconsistencies by providing a context-aware chording system, allowing users to apply a uniform set of command mappings across applications.

In some embodiments, the system further incorporates principles of muscle memory to improve user efficiency. Similar to the widely adopted WASD key layout in gaming, which allows users to execute movement commands instinctively, the chording system and methods herein enables users to perform common operations without consciously thinking about key placement. Over time, users develop intuitive recall of command sequences, minimizing cognitive load and improving operational speed.

By leveraging an optimized chording methodology, the present invention enhances command execution efficiency, reduces reliance on modifier-heavy shortcuts, and ensures a scalable, application-agnostic input paradigm. The disclosed system provides a more intuitive, efficient, and ergonomic approach to keyboard-based interactions, addressing the limitations of traditional hotkey systems while maximizing workflow efficiency and user comfort.

Referring now to FIG. 1, FIG. 1 illustrates the practical application in an enterprise setting of an exemplary System for Dynamic Chord Based Input Processing 100 (hereinafter "system 100"). System 100 includes a chord-based input protocol, which is an enterprise-level software solution that enhances keyboard input efficiency via chording techniques, which are describe in detail further below.

For example, at the core of the system and methods of the embodiments described below are context-aware command execution models that is structured around so-called Sheets and Stacks. As discussed in detail further below, a Sheet is a set of commands mapped to specific chord combinations based on functionality, which are dynamically loaded based on the user's current activity. Sheets are in a stack. The sheet on top of the stack is the active sheet, and the active sheet changes depending on what the user is currently doing. When an application is focused, the sheet stack for that application is activated. In some embodiments, pinning a sheet prevents the active sheet from automatically changing.

Sheet Stacks allow for layered command execution, ensuring that commands remain relevant to the active application and workflow. Such stack-based architecture enables seamless transitions between different command sets, ensuring uniformity and predictability across various applications. In some embodiments, sticky Sheets allow certain shortcuts—such as clipboard functions—to remain globally available, regardless of context, while adaptive learning mechanisms optimize shortcut configurations over time.

Described in further detail below, an advanced input processing engine captures keystrokes, determines whether they belong to a valid chorded command, and executes the appropriate function in real time. Through a combination of signal filtering, phrase recognition, and simultaneous keypress analysis, the system and methods described herein provide an intelligent and fluid command interface that significantly reduces execution time compared to traditional shortcuts. With a highly configurable notation system, users can customize chord mappings, ensuring that the system adapts to their unique workflow.

By eliminating the inefficiencies of conventional hotkeys, unifying command execution across applications, and leveraging muscle memory for rapid input, this system redefines human-computer interaction. Whether in productivity software, professional creative tools, or operating system navigation, users benefit from unparalleled efficiency, reduced cognitive load, and a fundamentally improved computing experience.

As shown in FIG. 1, in some embodiments, system 100 is advantageously cloud-based, with computationally intensive tasks performed on a remote server 102. User devices 140 may include laptops, desktops, and/or mobile devices, which connect to system 100 via a cloud network 130. In some embodiments, remote database 150 stores configurations, user preferences, and trained models for adaptive learning, which is described in detail further below.

In some embodiments, server 102 includes processor 104 in communication with memory 106. Memory 106 may include software code 105. Processor 104 is configured to receive and execute software code 105 for implementing one or more of the embodiments described herein. For example, server 102 may execute code 105 and cause system 100 to connect and simultaneously present real-time 2D/3D images to one, some, or all user devices via a display device (e.g., 140 and/or 410).

In some embodiments, server 102 includes one or more modules for carrying out corresponding functions of the embodiments described herein, which are described in further detail below. For example, in some embodiments, server 102 modules may include: input capture and signal processing 108, chord recognition and processing 110, sheet management 112, command execution and integration 114, notation and user configuration 116, accessibility and assistive technology 118, application and system integration 120, and/or logging and debugging 122, (collectively "modules 108-122").

In some embodiments, server 102 may communicate to external resources 150 via network 130. In some embodiments, network 130 may include, for example, a LAN/WAN connection configured to provide an Internet connection via a hybrid fiber optic (HFC) transmission network, (e.g., Ethernet twisted shielded pair CAT-5, WiFi, premises coaxial cable network, or any other connection capable of establishing an Internet connection). In some embodiments, network 106 may include a wireless network capable of establishing an internet connection (e.g., 5G, LTE, 4G, CDMA, and the like). Network 130 facilitates leveraging external resources 150 for facilitating various functionality, which is described in further detail below.

In some embodiments, external resources 150 may include a remote database and/or access to $3^{rd}$ party API services that facilitates the integration and interaction between system server 102, and a remote client at user device 140, with external systems and resources for enhanced functionality. For example, resources 150 may facilitate connection with a variety of 3rd party API services, enabling the system to leverage external tools and data sources. Such API services could include, but are not limited to, platforms offering advanced AI processing capabilities and predictive analytics tools, which is described in further detail below. In some embodiments, external resources 150 may establish connections with one or more remote databases (not shown), which may be advantageous in augmenting system 100 data handling and processing capabilities. By implementing external resources 150, system 100 may advantageously expand the range of functionalities, such as real-time data analysis, machine learning processes, and sophisticated predictive modeling, which is discussed in further detail below. Such external resources 150 not only enriches the user experience by providing more accurate and efficient outcomes but also enhances the overall system's performance by integrating virtualization techniques for streamlining process efficiency, which is described in detail further below.

One or more components of system 100 (e.g., modules 108-122, processors 104, and/or user devices 140) may be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs (e.g. code 105) that are executable and/or interpretable on a programmable system including one or more programmable processor(s) (e.g., 104), which can be special or general purpose, coupled to receive data and instructions from, and to transmit data and instructions to, a storage system (e.g., memory 106), at least one input device, and at least one output device. The programmable system or computing system may include clients (e.g., user device 140) and servers (e.g., 102). A client and server are generally remote from each other and typically interact through a communication network (e.g., 130). The relationship of client and server arises by virtue of computer programs running on the respective computers and having a client-server relationship to each other.

Such computer programs, which can also be referred to programs, software, software applications, applications, components, or code, include non-transitory machine readable instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In server 102, each module 108-122 plays a synchronized role in concert with the operation of system 100. As described in further detail below, such modules 108-122 function alone and/or in coordination with one another for implementing the embodiments described herein. In the embodiments described herein, functions described as carried out by one module, may, in other embodiments, be carried out be a different module, or split among various modules. For example, functions described as performed by command execution and integration 114 in one embodiment, may, in another embodiment, be performed by Application and system integration 120, and/or logging and debugging 122, and/or vice versa.

As discussed above, server 102 comprises multiple processing modules (108-122) that collectively interpret chord-based input sequences, manage application-specific command mappings, and ensure seamless execution of user interactions across different computing platforms. Within the server 102, processor 104 executes the primary computational tasks, while memory 106 stores operational logic, including the code 105 that defines the recognition patterns, command mappings, and system configurations. Server 102 architecture is configured to dynamically analyze keystroke input, determine the presence of chord sequences, and match recognized chords to the appropriate commands within a context-aware execution framework.

In some embodiments, Input Capture and Signal Processing Module 108 is responsible for receiving and filtering keystroke input data transmitted from the client devices 140. In some embodiments, module 108 captures real-time input from a standard keyboard, a touchscreen-based virtual keyboard, or a specialized input device. In some embodiments, once an input is detected, system 100 determines whether it should be processed as part of a chord sequence or passed through to the client-side operating system. In some embodiments, the signal processing logic applies a simultaneity threshold, ensuring that keystrokes pressed within a pre-defined time window are interpreted as a single chord rather than separate, unrelated keypresses. If/when the detected input is determined to be part of a valid chord, such detected input may be transmitted to Chord Recognition and Processing Module 110 for further interpretation.

In some embodiments, Chord Recognition and Processing Module 110 applies a pattern-matching algorithm to classify key sequences into predefined chording categories. In some embodiments, module 110 supports multiple types of chord recognition, including simultaneous keypresses, ordered key sequences, and press-release-based interactions. Module 110 may further differentiate between various press and release orders, allowing a single chord (e.g., a combination of "C" and "V") to trigger distinct actions depending on whether both keys are pressed simultaneously, sequentially, or released in a particular order. In some embodiments, module utilizes machine learning techniques to optimize chord recognition based on user behavior, frequency of use, and contextual application data. Once a chord is successfully identified, the system determines the appropriate command by referencing the Sheet Management Module 112.

In some embodiments, Sheet Management Module 112 facilitates a structured approach to context-sensitive command execution by including and dynamically associating recognized chords with predefined command Sheets. In some embodiments, individual applications running on a client device 140 has an associated Base Sheet, which serves as the primary command mapping for that software environment. System 100 advantageously maintains a Sheet Stack, wherein different Sheets may be layered dynamically based on user actions, application states, or operating system events. In some embodiments, certain Sheets, referred to as Sticky Sheets, may persist across multiple applications, ensuring that essential functions such as clipboard management, window switching, or text formatting remain consistently accessible. In some embodiments, Sheet Management Module 112 further enables users to define custom Sheets, allowing for personalized command configurations suited to specific workflows.

In some embodiments, once a command is mapped to a recognized chord, Command Execution and Integration Module 114 is responsible for interfacing with the client-side applications and operating system to ensure proper execution. In some embodiments, module 114 interacts with Windows, macOS, and Linux environments to invoke native keyboard shortcuts, API-based commands, and/or macro sequences. Module 114 may further support third-party software integrations, enabling direct interaction with enterprise applications, creative tools, and productivity suites. In some embodiments, system 100 is configured to work across multiple input environments, allowing seamless execution whether the user (e.g., 140) is interacting with a local desktop application, a web-based interface, or a remote terminal session.

In some embodiments, Notation and User Configuration Module 116 provides a flexible framework for customizing chording sequences, adjusting timing parameters, and defining user-specific input mappings. In some embodiments, users may create custom notation rules to describe chord interactions in an intuitive, human-readable format. The system further supports adaptive learning, wherein frequently used chord sequences are automatically suggested or optimized based on user behavior. In some embodiments, system 100 allows users to export and import configuration files, enabling portability across multiple devices and computing environments.

For ensuring inclusivity and accessibility, Accessibility and Assistive Technology Module 118 provides support for users with disabilities or alternative input needs. In some embodiments, the system enables voice-activated chording, wherein users may issue verbal commands that are processed as equivalent to keyboard chord sequences. The system may further support one-handed operation, wherein frequently used chord combinations are mapped to a reduced set of keys to accommodate users with limited mobility. In some embodiments, the module integrates with screen readers, haptic feedback devices, and eye-tracking systems to enhance the user experience for individuals requiring assistive technologies.

Application and System Integration Module 120 ensures that the chording system operates seamlessly across multiple platforms. In some embodiments, module 120 maintains compatibility with enterprise software ecosystems, cloud-based applications, and local desktop environments. System 100 may include plug-in support for third-party applications, allowing direct embedding of chording functionalities into external software. In some embodiments, module 120 supports cloud synchronization, ensuring that user-defined configurations remain consistent across multiple client devices 140 connected to the server 102.

In some embodiments, to provide system monitoring, error tracking, and performance optimization, Logging and Debugging Module 122 records input events, command execution logs, and system state changes. In some embodiments, module 122 enables real-time debugging tools, allowing users to visualize chord recognition events, active Sheets, and execution traces. System 100 may further generate usage analytics, helping users optimize their chording configurations based on frequency analysis and execution efficiency.

In some embodiments, system 100 employs a structured methodology to interpret keypress sequences, categorize them as chords, and map them to context-aware commands. The functionality of the system is distributed across multiple computational modules (e.g., 108-122 within server 102, allowing for real-time input processing and execution across client devices 140. The system architecture, as shown in FIG. 1, is designed to optimize user interactions by reducing reliance on traditional modifier-based shortcuts while enabling advanced chording techniques through a combination of chord recognition, notation, and context-aware command mapping, which is discussed in detail below.

For example, in some embodiments, system 100 operates through three execution threads, each of which is implemented via distinct modules in FIG. 1. For example, an engine thread (i.e., the engine) may be executed by Chord Recognition and Processing Module 110. The engine is responsible for detecting, mapping, and processing keypress sequences into recognizable chording patterns.

In some embodiments, when an input matches a predefined chord mapping stored in Sheet Management Module 112, such input may be passed to Command Execution and Integration Module 114 for execution. Such structure enhances efficiency and reduces hand movement by enabling multiple chording techniques, rather than relying solely on static modifier-based shortcuts.

In some embodiments, a notation thread (i.e., the notation) may be managed by Notation and User Configuration Module 116. For example, a standardized notation system may be utilized for representing chording interactions, ensuring consistency in how keypress sequences are identified and interpreted across different devices. The notation defines how keypresses, holds, releases, and sequences are represented in plain text for processing. Moreover, the notation system ensures that user-defined chord mappings remain consistent across different applications and workflows, reducing cognitive load.

In some embodiments, a sheet thread (i.e. sheets) may be dynamically managed by Sheet Management Module 112. For example, such Sheets act as context-sensitive layers that determine which commands are available based on the active application or workflow context. System 100 maintains a stack of Sheets, where the topmost active Sheet determines the currently available command mappings. Sheets allow for fluid transitions between different application states, ensuring that chords remain intuitive and accessible across multiple workflows.

In some embodiments, Chord Recognition and Processing Module 110 enables multiple advanced chording techniques, including: 1) traditional modifier-based chords (e.g., Ctrl+C, Alt+F4), which ensuring compatibility with legacy keyboard shortcuts, 2) extended chording (e.g., C+V for pasting without requiring Ctrl), which reduces reliance on hard-to-reach modifier keys; 4) Release-Based Functionality, where commands change based on the order of key releases (e.g., releasing Ctrl before C executes a standard copy, while releasing C first triggers an alternate copy mode), and/or 5) time-based chording, where holding a key for a predefined duration triggers alternative command execution (e.g., holding Z for 200 ms activates a secondary function).

Thus, by combining modules 108-122 within server 102, system 100 provides a scalable, adaptive, and highly efficient input processing architecture. The centralized server approach allows for real-time updates, intelligent input recognition, and seamless integration with a wide range of computing environments. The system improves user efficiency, reduces cognitive load, and enhances accessibility, making it an essential innovation in human-computer interaction.

Figure 2:
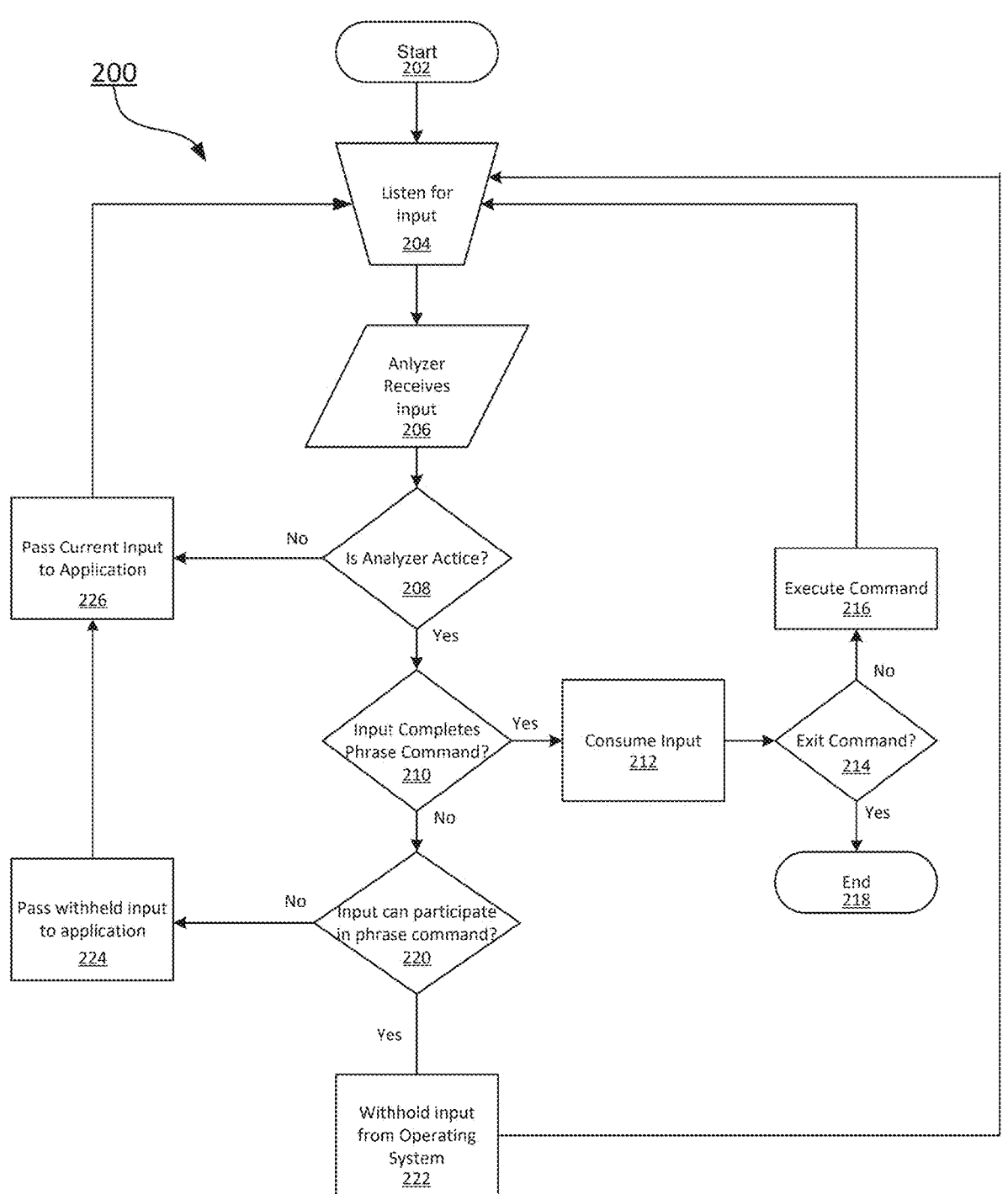

Referring now to FIG. 2 in conjunction with FIG. 1, FIG. 2 FIG. 2 illustrates an exemplary flowchart 200, which represents a method for processing chord-based input recognition, interpretation, and execution within system 100. The method of flowchart 200, as executed by system 100, enables an intelligent, context-aware input processing system that extends traditional keyboard interactions into a more efficient, customizable, and ergonomic chording-based interface. By dynamically recognizing and processing chording sequences, filtering input events, and mapping recognized phrases to context-sensitive Sheets, the system ensures that user commands are executed efficiently and consistently across multiple applications and computing environments. By leveraging Input Capture and Signal Processing Module 108, Chord Recognition and Processing Module 110, Sheet Management Module 112, and Command Execution and Integration Module 114, the system provides a scalable and adaptable framework that enhances productivity, minimizes repetitive strain, and streamlines user workflows.

In some embodiments, the method begins by initializing system 100 and determining, or listening for, keystroke input data from client devices 140, which may include physical keyboards, touchscreen interfaces, or other input peripherals. In some embodiments, the process involves multiple decision points to determine whether an input constitutes a valid chord sequence, whether such input should be executed as a command, or whether the input should be ignored or passed through to the underlying application.

In some embodiments, server 102 executes the processes depicted by flowchart 200 by leveraging Input Capture and Signal Processing Module 108, Chord Recognition and Processing Module 110, Sheet Management Module 112, Command Execution and Integration Module 114, and other associated components (e.g., modules 116-122). Modules 108-122 work together to ensure that input sequences are dynamically processed, contextually mapped to Sheets, and accurately executed in real-time across different applications and computing environments.

For example, in some embodiments, flowchart 200 includes or begins at step 202, where server 102 initializes and activates all required processing modules. In some embodiments, this step involves loading predefined user configurations from database 150, retrieving stored Sheet mappings, and ensuring that all input capture and processing subsystems are operational. The Input Capture and Signal Processing Module 108 is activated to monitor keystroke activity from client devices 140, ensuring that incoming input is captured, timestamped, and prepared for further analysis.

At step 204, Input Capture and Signal Processing Module 108 continuously monitors input events originating from client devices 140. In some embodiments, module 108 intercepts both hardware-based keystrokes and software-generated virtual key events, allowing module 108 to operate across multiple input modalities. The captured keystrokes are preprocessed to normalize input timing, filter out noise, and detect simultaneity thresholds that may indicate chord formation. In some embodiments, the raw input data is then forwarded to Chord Recognition and Processing Module 110 for further analysis.

At step 206, Chord Recognition and Processing Module 110 receives the keystroke data and begins its analysis process. In some embodiments, this module applies pattern recognition algorithms to determine whether the incoming keystrokes match a predefined chording sequence. In some embodiments, system 100 may evaluate one or more factors including: a simultaneity of key presses (whether multiple keys were pressed together within a configurable time threshold), the order of key presses (whether keys were pressed sequentially in a specific pattern), a press and release timing (whether the duration between presses alters the intended function). In some embodiments, when/if the incoming keystroke sequence does not meet the criteria for chording, system 100 determines whether the input should be processed normally by the underlying application.

At step 208, system 100 evaluates whether Chord Recognition and Processing Module 110 is currently active. In some embodiments, the analyzer is enabled when an application with active Sheet mappings is detected, or when a user has explicitly enabled chording mode. If Chord Recognition and Processing Module 110 is inactive, system 100 bypasses further analysis and directly forwards the input to the underlying application at step 226. If the module is active, the process continues to step 210 to determine whether the input completes a valid chord-based phrase command.

At step 210, Chord Recognition and Processing Module 110 assesses whether the detected keystroke sequence forms a complete, valid chord that corresponds to a mapped command in Sheet Management Module 112. In some embodiments, system 100 matches the chord against Base Sheets, Sticky Sheets, and context-sensitive Sheet Stacks to determine the most relevant command execution. If a valid chording sequence is detected, the system moves to step 212, where the input is consumed and mapped to a command action. If the input does not form a complete phrase command, the system proceeds to step 220 to determine whether it can still participate in a valid multi-key sequence.

At step 212, if the input completes a valid phrase command, such input is consumed, meaning the input will not be passed to the application as a normal keystroke. The system then proceeds to step 216, where Command Execution and Integration Module 114 processes the recognized command. In some embodiments, module 114 interfaces with operating system APIs, application-level commands, or third-party automation frameworks to execute the desired action.

In some embodiments, commands executed in step 216 may include one or more of: clipboard operations (e.g., cut, copy, and paste), application-specific functions (e.g., formatting, tool selection, macro execution), window management actions (e.g., switching focus, minimizing applications), automation sequences (e.g., triggering complex workflows). In some embodiments, when the executed command is identified as an exit command, the system proceeds to step 218, where the process terminates. Otherwise, the system loops back to step 204 to continue monitoring for additional input.

If the detected keystroke does not complete a valid phrase command, the system determines at step 220 whether it can still participate in an ongoing chording sequence. In some embodiments, Sheet Management Module 112 maintains partial chord states, allowing additional keystrokes to be processed within a configured time window before finalizing execution.

If the input is determined to be potentially part of a valid sequence, the system withholds it from the operating system at step 222 to prevent unintended keystroke actions. The system continues to monitor subsequent input events, ensuring that the full intended command sequence is captured before making a decision on execution. If the input is determined to be unrelated to any chord-based operation, the system proceeds to step 224, where the withheld input is released and passed to the underlying application.

At step 224, if previously withheld input does not complete a valid chording sequence, it is released and forwarded to the active application on client devices 140. In some embodiments, the system may track user error patterns, logging instances where an incomplete chord was formed and providing adaptive feedback through Logging and Debugging Module 122 to help users refine their interactions.

At step 226, if the input is deemed unrelated to chording-based processing, it is simply passed through to the application in its original form, ensuring that normal typing and system interactions remain unaffected when no active chords are detected.

Thus, the process flow 200 in FIG. 2 defines the step-by-step execution of these chording techniques, ensuring that the correct Sheet, command execution pathway, and user-defined customization settings are applied dynamically. By integrating Chord Recognition and Processing Module 110, Sheet Management Module 112, and Notation and User Configuration Module 116, system 100 offers a highly flexible and efficient input processing framework that significantly enhances user workflow efficiency, reduces unnecessary hand movement, and supports multiple application contexts seamlessly.

The process flow of FIG. 2 ensures that user input is processed intelligently, context-aware Sheets are dynamically loaded, and commands are executed with precision and efficiency. Through adaptive learning, notation standardization, and advanced chording techniques, the system provides a highly scalable and customizable input paradigm for a wide range of computing environments.

The system continuously monitors keypress sequences from client devices 140 via the Step 204, handled by Input Capture and Signal Processing Module 108). Simultaneity thresholds are applied to determine whether input events constitute simultaneous chords or sequential keypresses. For example, if the input meets chording criteria, the input is sent to Chord Recognition and Processing Module 110. The system determines whether the input sequence forms a valid chording pattern based on stored mappings in Sheet Management Module 112.

The system evaluates press order, release order, and timing, determining whether the input should be executed, stored for further input, or forwarded as a standard keystroke. Once a chord is recognized, the system evaluates which active Sheet is currently loaded. If a Sticky Sheet is active, the system ensures persistent command execution across application switches. If a command is determined to be context-sensitive, the appropriate Sheet Stack is referenced to execute the relevant function. If a valid command is recognized, it is executed through direct application API calls, simulated hotkeys, or macro-based automation sequences. If adaptive learning is enabled, the system logs execution data for future optimization, allowing Notation and User Configuration Module 116 to refine command mappings. If an input does not complete a recognized chord, the system determines whether it could still be part of an ongoing sequence. If the input is unrelated to chording, such input is passed to the active application without modification.

Referring now to Table 1 below, Table 1 provides a structured overview of the chording system's rules and command protocols, categorizing key functionalities across the Engine, Chording Techniques, Notation System, and Sheets. The structured approach to Chord Rules and Command Protocols shown below in Table 1 ensures that chords are dynamically processed and optimized, providing greater efficiency, intuitive command execution, and reduced hand movement compared to traditional keyboard shortcuts. Table 1 details how keypress sequences are mapped to chords, how commands are executed based on timing, order, and context, and how Sheets dynamically manage command availability based on active applications and workflows:

TABLE 1

| Chord Rules and Command Protocols | | |
| --- | --- | --- |
| Category | Rule/Command Type | Description |
| Engine | Chord Mapping | Maps key sequences to recognized chording patterns. |
| | Context-Aware Execution | Commands execute based on active sheets and applications. |
| | Buffer-based Command Execution | Cut, Copy, and Paste functions use multiple buffer levels based on keypress order and release timing. |
| Chording Techniques | Traditional Modifier-Based Chords | Recognizes standard keyboard shortcuts such as Ctrl + C and Alt + F4. |
| | Extended Chording | Supports direct multi-key sequences without requiring a modifier (e.g., C + V for pasting). |
| | Release-Based Functionality | Differentiates commands based on the order of key releases (e.g., Ctrl + C vs. C + Ctrl). |
| | Time-Based Chording | Supports time-dependent input (e.g., holding z for 200 ms activates an alternate function). |
| Notation System | Keypress Notation | Standardized way to express key actions (A+ for press, A– for release, A* for press and release). |
| | Simultaneous Key Presses | Expressed using + (e.g., AS+ means A and s pressed together). |
| | Press-Hold Release Timing | Example: A+ 10-20 means press A for 1-2 seconds before releasing. |
| | Multi-Step Sequences | Example: AS+ D* means press A and S together, then press and release D. |
| | Global Shortcut Sequences | Supports command chaining (e.g., z+ L* K* J* allows playing sequences like Mary Had a Little Lamb). |
| Sheets | Context-Aware Chord Mapping | Sheets map chords to commands dynamically based on active applications. |
| | Sheet Stacks | Multiple sheets can be layered, with the topmost active sheet determining available commands. |
| | Sticky Sheets | Certain sheets persist across applications, ensuring frequently used commands remain accessible. |
| | Pinned Sheets | Users can pin sheets to prevent automatic switching when changing contexts. |

Referring now to FIGS. 3A-3C, FIGS. 3A-3C depict methods 300A-300C, which correspond to process flows, in accordance with some embodiments. FIG. 3A illustrates an exemplary method flowchart 300A for processing chord-based input sequences and executing corresponding application commands. The method begins with receiving keypress input events via an input capture module, where a sequence of keypresses from a keyboard input device is detected and processed. The system then proceeds to analyze the keypress sequence using a chord recognition module, which applies predefined chording rules to determine whether the sequence constitutes a recognized chord pattern.

In some embodiments, once a chord pattern is recognized, the system classifies the chord pattern based on its structure, timing, and release sequence. After classification, the system determines the appropriate active command sheet by referencing a sheet management module, which assigns the command sheet based on the currently active application. The recognized chord pattern is then mapped to a command entry within the active command sheet, ensuring that the correct function is executed in context.

In some embodiments, the system executes the corresponding application command via a command execution module, ensuring that the recognized chord pattern results in the intended system or application response. Such structured approach enables efficient and context-sensitive command execution, allowing for dynamic chording configurations and user-defined command mappings.

FIG. 3B illustrates an exemplary method flowchart 300B for dynamically managing chord-based command execution using context-aware sheet management. The process begins with detecting a keypress sequence from a keyboard input device via an input capture module. The system then proceeds to identify whether the keypress sequence corresponds to a predefined chording pattern using a chord recognition module, ensuring that recognized inputs are processed according to the system's chording rules (e.g., Table 1).

In some embodiments, after identifying a valid chording pattern, the system determines the active application currently in focus on the computing device via a sheet management module. Based on the detected application, the system selects a corresponding command sheet, wherein the selected sheet contains predefined chording pattern mappings specific to that application. If the selected command sheet is part of a sheet stack, the system evaluates multiple layers of command sheets, prioritizing them based on application context to ensure the most relevant command sheet is applied.

In some embodiments, once the highest-priority command sheet in the sheet stack is identified, the system executes the command associated with the recognized chording pattern via a command execution module. To maintain persistent functionality across applications, the system also provides at least one sticky sheet, which remains active across application switches to ensure that globally relevant commands, such as clipboard functions or screen navigation shortcuts, are always accessible. Such dynamic sheet management process enables adaptive command execution, allowing users to interact seamlessly across different applications while maintaining a consistent and intuitive chording-based workflow.

Figure 4:
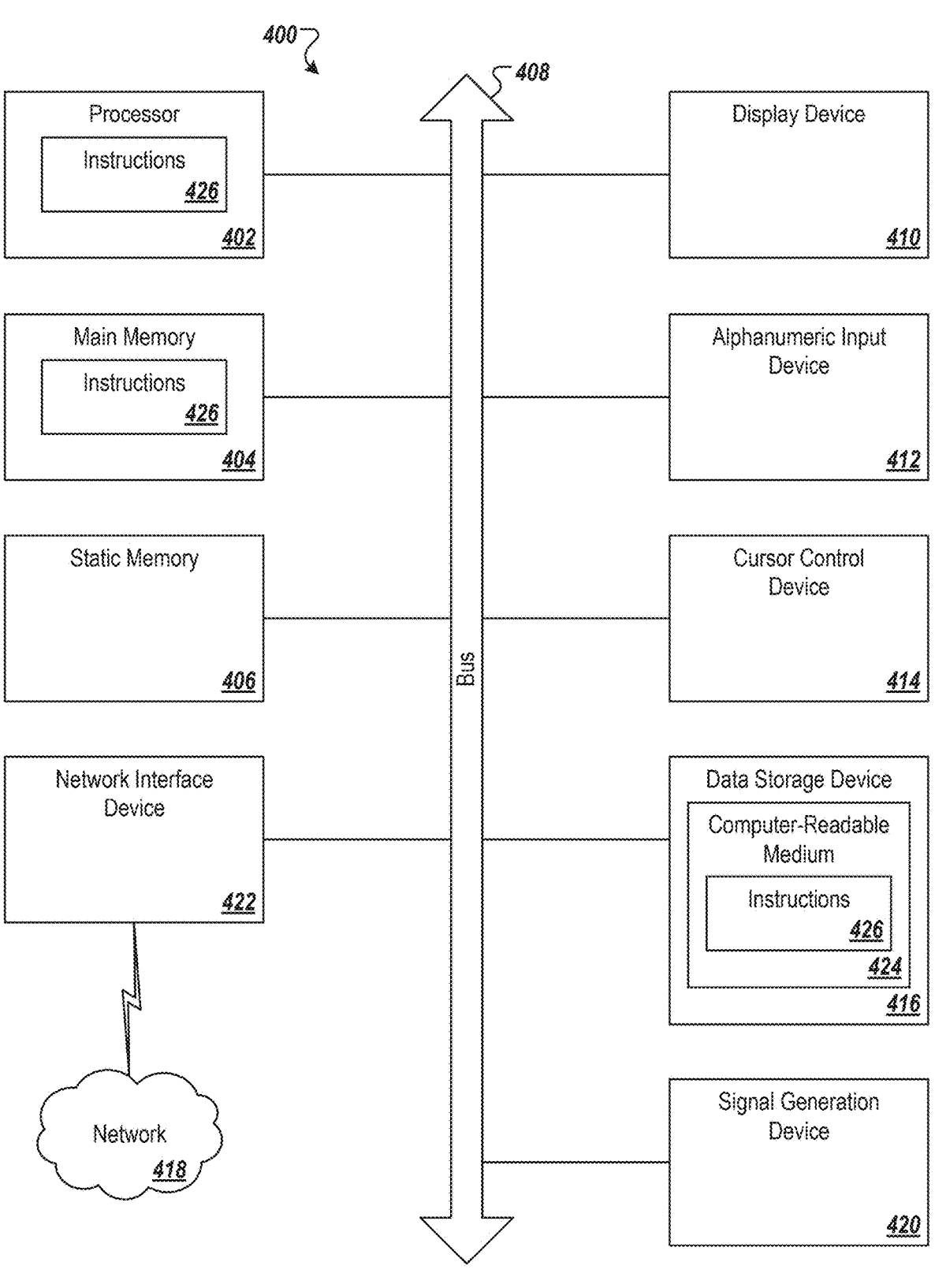
FIG. 4 is a schematic for an exemplary system for chord-based input processing, in accordance with some embodiments.

Referring now to FIG. 4, FIG. 4 illustrates a diagrammatic representation of a machine in the example form of a computing device 400 within which a set of instructions, for causing the machine to perform any one or more of the methods discussed above, may be executed. The computing device 400 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative examples, the machine may be connected (e.g., networked) to other machines in a local area network (LAN), an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 400 includes a processing device (e.g., a processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)) and a data storage device 416, which communicate with each other via a bus 408.

Processing device 402 represents one or more general-purpose processing devices such as a microprocessor, central processing unit, or the like. More particularly, the processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also include one or more special-purpose processing devices such as an application specific integrated circuit (ASIC), a field programmable gate array (FPGA), a DSP, network processor, or the like. The processing device 402 is configured to execute instructions 426 for performing the operations and steps discussed herein.

The computing device 400 may further include a network interface device 422 which may communicate with a network 418. The computing device 400 also may include a graphic user interface or display device 410 (e.g., a liquid crystal display (LCD) or a cathode ray tube (CRT)), an alphanumeric input device 412 (e.g., a keyboard), a cursor control device 414 (e.g., a mouse) and a signal generation device 420 (e.g., a speaker). In at least one example, the display device 410, the alphanumeric input device 412, and the cursor control device 414 may be combined into a single component or device (e.g., an LCD touch screen).

The data storage device 416 may include a computer-readable storage medium 424 on which is stored one or more sets of instructions 426 embodying any one or more of the methods or functions described herein. The instructions 426 may also reside, completely or at least partially, within the main memory 404 and/or within the processing device 402 during execution thereof by the computing device 400, the main memory 404 and the processing device 402 also constituting computer-readable media. The instructions may further be transmitted or received over a network 418 via the network interface device 422.

While the computer-readable storage medium 424 is shown in an example to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Thus, the embodiments described above provide an advanced framework for chord-based input processing and context-aware command execution, addressing the limitations of traditional keyboard shortcuts and enhancing user efficiency across computing environments. By implementing chord recognition techniques, including modifier-based, extended, release-based, and time-based chording, these embodiments significantly expand the range of available input commands while minimizing hand movement and cognitive load. The sheet management architecture introduces dynamic command mapping, allowing commands to be context-sensitive and application-aware, while the use of sheet stacks and sticky sheets ensures seamless command accessibility across workflows. Additionally, the incorporation of adaptive learning and user customization enables real-time optimization of chording configurations, allowing the system to evolve based on user behavior and preferences.

Through server-based processing, intelligent input filtering, and a flexible notation system, the embodiments described above deliver a scalable, ergonomic, and highly efficient input paradigm applicable to a wide range of computing devices. The integration of machine learning, configurable sheet stacks, and hierarchical command execution further enhances adaptability, enabling personalized, and application-agnostic input control. By leveraging these innovations, the embodiments described above provide a significant improvement over conventional hotkey systems, creating a more intuitive, efficient, and user-friendly approach to command execution in digital environments.

The embodiments described herein may be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above described advantages are not intended to limit the application of any issued claims to processes and structures accomplishing any or all of the advantages.

Furthermore, any reference to this disclosure in general or use of the word "embodiment" in the singular is not intended to imply any limitation on the scope of the claims set forth below. Multiple embodiments may be set forth according to the limitations of the multiple claims issuing from this disclosure, and such claims accordingly define the embodiment(s) herein, and their equivalents, that are protected thereby.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for processing chord-based input sequences on a computing device having a keyboard input device and running a plurality of applications on an operating system, the method comprising:

receiving, via an input capture module, a sequence of keypress events from the keyboard input device;

analyzing, based on one or more predefined chording rules, via a chord recognition module, the sequence of keypress events to determine when the sequence constitutes a recognized chord pattern;

classifying the recognized chord pattern;

determining, based on a classification, via a sheet management module, an active command sheet associated with an application;

mapping, via the sheet management module, the recognized chord pattern to a command entry in the active command sheet;

executing, via a command execution module, an application command corresponding to the recognized chord pattern; and releasing, via an input filter module, an unrecognized keypress to the operating system or active application.

2. The method of claim 1, wherein classifying the recognized chord pattern includes classifying into at least one of:

(i) a traditional modifier-based chord pattern requiring a modifier key and a primary key;

(ii) an extended chording pattern wherein at least two non-modifier keys are pressed simultaneously to execute a command;

(iii) a release-based chording pattern wherein command execution is determined by the sequence in which keys are released; and/or (iv) a time-based chording pattern wherein a keypress held for at least a predetermined duration triggers a distinct command.

3. The method of claim 1, wherein the predefined chording rules include a simultaneity threshold, such that keypresses detected within a predetermined time window are classified as a simultaneous chord pattern.

4. The method of claim 1, wherein the release-based chording pattern further comprises executing different commands based on whether a first key is released before or after a second key in the recognized chord pattern.

5. The method of claim 1, wherein the time-based chording pattern is configured to differentiate between multiple command executions based on varying keypress hold durations.

6. The method of claim 1, further comprising dynamically updating the predefined chording rules based on user behavior and adaptive learning models to optimize frequently used chord patterns.

7. A method for dynamically managing chord-based command execution in a computing environment, the method comprising:

detecting, via an input capture module, a keypress sequence from a keyboard input device;

identifying, via a chord recognition module, when the keypress sequence corresponds to a predefined chording pattern;

determining, via a sheet management module, an active application currently in focus on the computing device;

selecting, via the sheet management module, a command sheet associated with the active application, wherein the command sheet contains chording pattern mappings corresponding to the active application;

determining, via the sheet management module, when the selected command sheet is part of a sheet stack, the sheet stack comprising multiple layers of command sheets prioritized based on application context;

executing, via a command execution module, a command associated with the recognized chording pattern correspond to a highest-priority command sheet in the sheet stack; and providing, via the sheet management module, at least one sticky sheet that persists across application switches to provide global command functionality.

8. The method of claim 7, further comprising dynamically updating the sheet stack when an application switch is detected, such that the active sheet is replaced or modified based on the newly focused application.

9. The method of claim 7, wherein the priority of a command sheet within the sheet stack is determined based on at least one of user-defined preferences, frequency of use, or system-defined command relevance.

10. The method of claim 7, wherein the sticky sheet includes global commands that remain accessible regardless of the active application, including clipboard functions, window switching, and system navigation commands.

11. The method of claim 7, further comprising allowing a user to pin a selected command sheet, preventing automatic switching to another sheet when an application context change is detected.

12. A method for adaptive learning and customization of chord-based input processing in a computing environment, the method comprising:

receiving, via an input capture module, a sequence of keypress events from a human input device;

analyzing, via a chord recognition module, when the keypress sequence corresponds to a predefined chording pattern;

tracking, via a machine learning module, user interactions and frequency of chording pattern executions over time;

generating, via the machine learning module, an optimization recommendation based on user behavior patterns, wherein the optimization recommendation includes at least one of suggesting alternative chording configurations or reassigning frequently used commands to more ergonomic key combinations;

presenting, via a graphic user interface, the optimization recommendation to a user for review and confirmation;

enabling, via a notation customization module, user-defined modification of chord mappings, wherein users can manually adjust chording configurations to align with their workflow; and storing, via a configuration database, the customized chording configurations and dynamically updating the chording recognition model based on user preferences.

13. The method of claim 12, wherein the machine learning module applies predictive analytics to detect inefficient chording patterns and suggest alternative sequences that minimize finger movement and execution time.

14. The method of claim 12, wherein the system allows a user to manually override machine-generated optimization recommendations and customize chord notation using a graphical or text-based configuration interface.

15. The method of claim 12, further comprising dynamically adjusting chording recognition parameters, including simultaneity thresholds and press-release timing, based on observed user behavior and adaptation patterns.

16. The method of claim 12, wherein the machine learning module groups frequently executed chording patterns into usage profiles, allowing multiple users to apply shared or recommended chording configurations based on similar workflow behaviors.

17. A system (100) for processing chord-based input sequences and managing context-aware command execution, the system comprising:

A display device (610) a server (102) configured to receive and process input from at least one client device 140;

a processor (104) in communication with a memory (106), the memory storing executable instructions that when executed by the processor configure the system to execute on or more modules, the modules comprising:

an input capture module, executed by the server, configured to receive a sequence of keypress events from a human input device and filter input signals for processing;

a chord recognition module, executed by the server, configured to analyze the keypress sequence to determine whether the sequence constitutes a recognized chording pattern based on predefined chording rules, wherein the chording rules define at least one of:

(i) traditional modifier-based chording, (ii) extended chording using simultaneous non-modifier keypresses, (iii) release-based chording wherein command execution is determined by the order of key releases, and (iv) time-based chording wherein a keypress held for a predetermined duration triggers a distinct command;

a sheet management module, executed by the server, configured to dynamically assign a command sheet to the recognized chording pattern, wherein the command sheet is selected based on the active application or computing context;

a sheet stack manager, executed by the server, configured to prioritize multiple command sheets, wherein a highest-priority sheet in the stack determines command execution when multiple layers of command mappings are active;

a command execution module, executed by the server, configured to execute a system or application command corresponding to the recognized chording pattern and mapped command entry in the active command sheet; and a storage module, configured to maintain user-defined chording configurations, sheet mappings, and adaptive learning data for optimizing future command execution.

18. The system of claim 17, wherein the sheet management module further comprises a sticky sheet manager configured to maintain a subset of command sheets that persist across application switches, allowing for the execution of globally accessible commands independent of the active application.

19. The system of claim 17, wherein the chord recognition module is further configured to dynamically adjust chording recognition parameters, including simultaneity thresholds and keypress-release timing, based on user behavior tracked over time.

20. The system of claim 17, wherein the sheet stack manager enables user customization of sheet priority, allowing a user to pin selected command sheets to override automatic application-based sheet selection.

\* \* \* \* \*